United States Patent
Ball et al.

(10) Patent No.: US 11,442,705 B2
(45) Date of Patent: **\*Sep. 13, 2022**

(54) CODE EXECUTION AND DATA PROCESSING PIPELINE

(71) Applicant: Palantir Technologies Inc., Denver, CO (US)

(72) Inventors: Eliot Ball, London (GB); Matthew Jenny, London (GB); Nicholas Gates, London (GB); Erin Price-Wright, London (GB); Kamran Khan, London (GB); Gregory Manis, Brooklyn, NY (US); Emeline Wu, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,440

(22) Filed: Mar. 17, 2021

(65) Prior Publication Data
US 2021/0200517 A1    Jul. 1, 2021

Related U.S. Application Data

(63) Continuation of application No. 16/262,150, filed on Jan. 30, 2019, now Pat. No. 10,970,049.

(Continued)

(51) Int. Cl.
*G06F 9/445*    (2018.01)
*G06F 8/33*    (2018.01)
(Continued)

(52) U.S. Cl.
CPC ............. *G06F 8/34* (2013.01); *G06F 3/0482* (2013.01); *G06F 3/04847* (2013.01);
(Continued)

(58) Field of Classification Search
CPC .... G06F 3/0482; G06F 3/04847; G06F 3/061; G06F 3/0649; G06F 3/0685; G06F 8/33; G06F 8/34; G06F 9/445
See application file for complete search history.

(56) References Cited

U.S. PATENT DOCUMENTS 10,970,049 B2    4/2021    Ball et al.
2002/0035579 A1*    3/2002    Wang ..................... G06F 16/84
                                                                    707/E17.121
(Continued)

OTHER PUBLICATIONS

Kshitija Shinde and Yu Sun, Template-Based Code Generation Framework for Data-Driven Software Development, IEEE, 2016, retrieved online Apr. 29, 2022, pp. 55-60. Retrieved from the Internet: <URL: https://ieeexplore.ieee.org/stamp/stamp.jsp?tp=& arnumber=7916958>. (Year: 2016).*

(Continued)

*Primary Examiner* — Hanh Thi-Minh Bui
(74) *Attorney, Agent, or Firm* — Knobbe, Martens Olson & Bear, LLP

(57) ABSTRACT

A method performed by one or more processors comprises displaying code, receiving user selection of a portion of code, determining one or more settable data items, generating a template, displaying the template, receiving a user input value for the settable data items by the template, and executing the code with each of the settable data items set to the received user input value. A data processing pipeline is configured to pass a data item to a first transformer to provide first transformed data, store the first transformed data in a temporary memory, write the first transformed data to the data storage system, and pass the transformed data from the temporary memory to a second transformer.

6 Claims, 7 Drawing Sheets

Related U.S. Application Data

(60) Provisional application No. 62/624,492, filed on Jan. 31, 2018.

(51) Int. Cl.
  *G06F 8/34* (2018.01)
  *G06F 3/0482* (2013.01)
  *G06F 3/04847* (2022.01)
  *G06F 3/06* (2006.01)

(52) U.S. Cl.
  CPC .............. *G06F 3/0685* (2013.01); *G06F 8/33* (2013.01); *G06F 9/445* (2013.01)

(56) References Cited

U.S. PATENT DOCUMENTS

| | | | | |
|---|---|---|---|---|
| 2008/0127061 A1* | 5/2008 | Kasman | .............. | G06F 11/3664 717/106 |
| 2014/0245256 A1* | 8/2014 | Petzoldt | ................ | G05B 19/056 717/109 |
| 2017/0109378 A1* | 4/2017 | Brewster | .............. | G06F 16/221 |

OTHER PUBLICATIONS

Official Communication for EP Application No. 19154506.0 dated Nov. 29, 2021, 4 pages.

\* cited by examiner

CODE EXECUTION AND DATA PROCESSING PIPELINE

INCORPORATION BY REFERENCE TO ANY PRIORITY APPLICATIONS

This application is a continuation of U.S. patent application Ser. No. 16/262,150, filed on Jan. 30, 2019, which claims benefit of U.S. Provisional Patent Application No. 62/624,492, filed Jan. 31, 2018, and titled "CODE EXECUTION AND DATA PROCESSING PIPELINE". The entire disclosure of the above item is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The subject innovations relate to executing code and to a data processing pipeline.

BACKGROUND

Computers are very powerful tools for processing data. A computerized data pipeline is a useful mechanism for processing large amounts of data. A typical data pipeline is an ad-hoc collection of computer software scripts and programs for processing data extracted from "data sources" and for providing the processed data to "data sinks".

Between the data sources and the data sinks, a data pipeline system is typically provided as a software platform to automate the movement and transformation of data from data sources to data sinks. In essence, the data pipeline system shields the data sinks from having to interface with the data sources or even being configured to process data in the particular formats provided by the data sources. Typically, data from the data sources received by the data sinks is processed by the data pipeline system in some way. For example, a data sink may receive data from the data pipeline system that is a combination (e.g., a join) of data of from multiple data sources, all without the data sink being configured to process the individual constituent data formats.

One purpose of a data pipeline system is to execute data transformation steps on data obtained from data sources to provide the data in formats expected by the data sinks. A data transformation step may be defined as a set of computer commands or instructions (e.g., a database query) which, when executed by the data pipeline system, transforms one or more input datasets to produce one or more output or "target" datasets. Data that passes through the data pipeline system may undergo multiple data transformation steps. Such a step can have dependencies on the step or steps that precede it.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Figure 1:
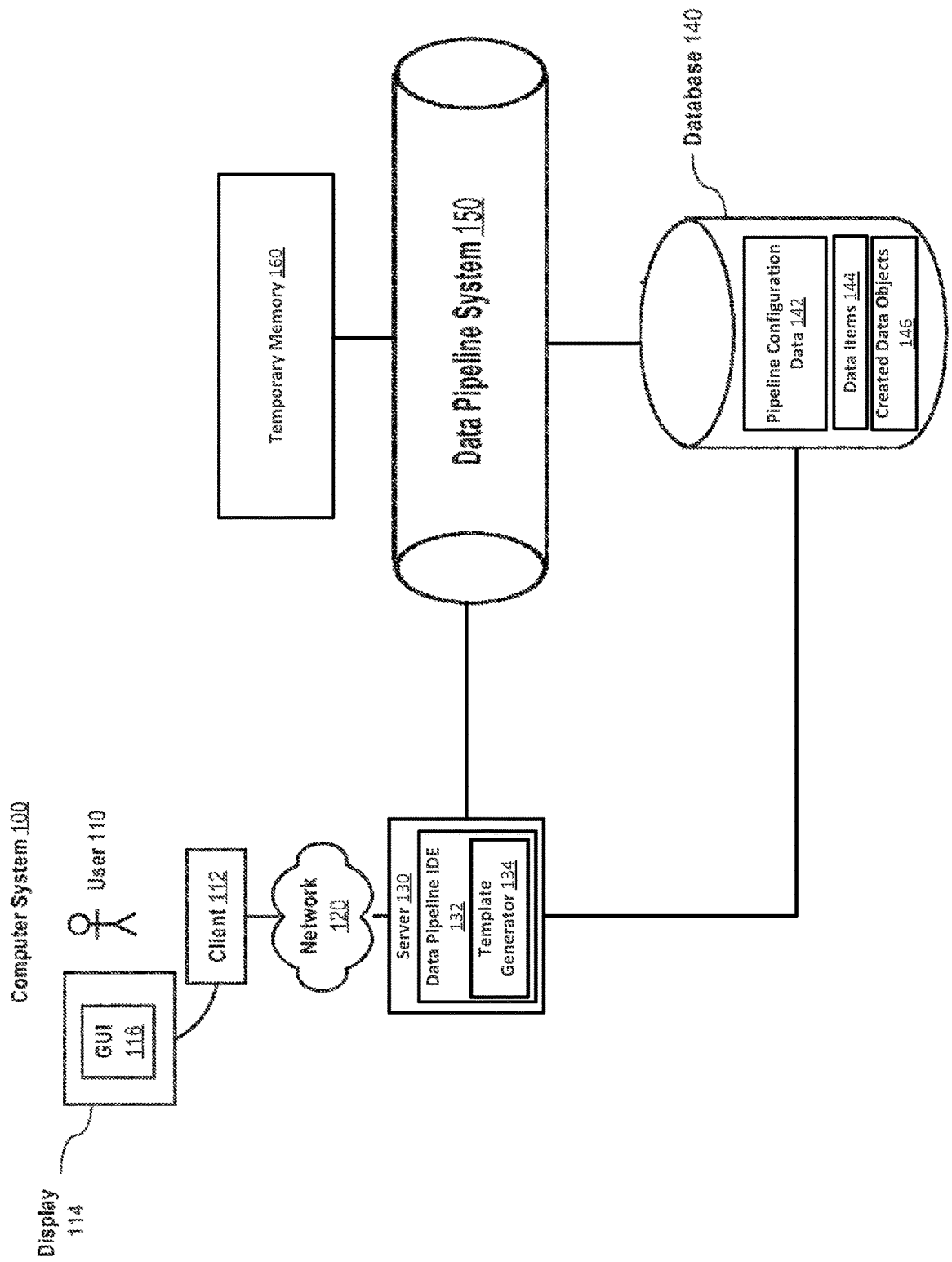
FIG. 1 is a block diagram illustrating an example of a computer system configured to develop and run a data processing pipeline, in accordance with example embodiments.

The detailed description set forth below is intended as a description of various configurations of the subject innovations and is not intended to represent the only configurations in which the subject innovations may be practiced. The appended drawings are incorporated herein and constitute a part of the detailed description. The detailed description includes specific details for the purpose of providing a thorough understanding of the subject innovations. However, the subject innovations are not limited to the specific details set forth herein and may be practiced without these specific details. In some instances, some structures and components are shown in block diagram form in order to avoid obscuring the concepts of the subject innovations.

General Overview

For ease of explanation, the subject innovations are largely described in the context of a data pipeline system. It should, however, be recognized that some aspects of these innovations are applicable in other contexts. Examples of such contexts include, but are not limited to, software development environments.

As noted above, a typical data pipeline system is an ad-hoc collection of computer software scripts and programs for processing data extracted from "data sources" and for providing the processed data to "data sinks". Managing and developing such an ad-hoc collection may, however, be technically difficult, particularly when there are multiple transformation steps with later steps having dependencies on preceding steps. It should be further noted that these difficulties in management and development are likely to lead to unstable systems that do not fulfil their desired purpose. Similarly, they make it very difficult, if not impossible, for users without specialist expertise to develop and manage these systems.

Furthermore, an ad-hoc collection of software scripts and programs is not well suited to displaying pipeline results. Not only does this prevent such users from fully benefiting from a pipeline system, it is a significant hindrance to pipeline developers who rely on such results, particularly of intermediary steps, to debug and enhance the pipeline system.

Additionally, pipeline system implementations that prioritize data integrity and robustness over performance make it difficult for results to be displayed quickly.

The subject innovations relate to systems and methods for developing and executing a data processing pipeline. The aspects of these innovations relating to developing such a data processing pipeline will be addressed first with those relating to executing the pipeline being addressed second.

These first aspects relate to providing a pipeline development system that enables users without specialist expertise to develop a data processing pipeline. The system presents an interface to allow users to specify the data used and transforms performed by each step of the pipeline. Each step uses data items from an underlying data storage system, e.g. a database, and/or data items produced by preceding steps in the data processing pipeline. A wide range of transforms are also possible. Examples of such transforms are database joins, complex numerical operations, data format conversion, or any combination thereof. The development environment may also allow users to run the developed data processing pipeline and display the results produced by each of the intermediary steps to users in a consistent manner.

Various methods are made available to users for specifying transforms in the pipeline development system. One method is by providing code for performing a transform. It should be noted that providing transform code does not require users to have specialist expertise in data pipeline systems. Specialized APIs are provided so that users can easily access the data items on which the transform depends. Therefore, users are able to provide code for performing the transform without needing knowledge of the mechanisms by which the data items are provided. Alternatively or in addition, the provided code may consist only of mathematical operations that are able to be applied to each of the data items.

Another method for users to specify a transform to use is by selecting one or more transforms from a list of provided transforms. This list of transforms contains transforms previously provided to the system as code, pre-configured transforms that are included in the development system, or both. This allows users who cannot program to specify the transforms to be performed, although it only allows them to select from a list of predefined transforms.

Transform templates allow users who cannot program to specify transforms and configure them. In this scenario, the user first selects a transform template. The transform template relates to some section of predefined code. The template allows a given user to set one or more settable data items, e.g. parameters and/or variables, of the code. In essence, this enables non-programming users to configure the transform. Examples of the types of settable data items include formula parameters, column names and units of measure. A given user may set the data by entering text or numbers in to a form field on the template and/or selection from a list of options e.g. in a drop down list.

A transform template generator is provided. This is configured to generate a transform template from a provided code transform. The transform template generator presents an interface relating to the provided code transform to a given user. At least some of the provided code of the transform is displayed in this interface. The user then selects a portion of the displayed code. From the selected portion of the displayed code, one or more settable data items, such as parameters and/or variables, are determined by the template generator. Internally, the template generator maintains a store of settable data items to be included in the template being generated. The determined settable data items are added to this store. The user may need to give some input, e.g. click on a button or press a keyboard key, to add the determined settable items to the list or they may be automatically added when the code portion is selected by the user. Items may be added, using the above steps, until all of the items that the user wants to be included in the template are in the list. The template is then generated. Typically, generation occurs subsequent to the template generator receiving some input, e.g. a mouse click on a generate button, from the user. The generated template is then stored by the pipeline development system so that it can be accessed by the system's users.

The second aspects relate to providing an enhanced data pipeline implementation that performs its steps more quickly and with reduced system resource usage.

The enhanced data pipeline implementation of the second aspects persistently store the results of intermediary steps while also avoiding a fraction of the persistent storage accesses. In this implementation, a step in the pipeline receives one or more data items from a data storage system or from preceding steps in the pipeline. A transform is then performed on these data items. The transformed data items are stored in a temporary memory, typically main memory, and an operation to persistently store them is started. If the next step of the pipeline depends on the transformed data items, the associated transform reads the transformed data items from the temporary memory and continues with its own transform. This step of the pipeline, therefore, avoids performing a slow persistent storage read and instead only has to perform a faster temporary memory read. This enhanced implementation also allows transform operations to be performed simultaneously with the persistent storage of the results of preceding transforms.

Accessing the persistent storage media typically takes significantly longer than performing transforms. This is primarily because persistent storage media accesses are much slower than CPU and main memory accesses. By avoiding accesses to persistent storage media, where possible, system resource usage is reduced and pipeline execution is sped up.

Instead of only storing the results of intermediary steps to and retrieving them from a temporary memory, in which case the results of the intermediary steps would not be persistently stored, according to the second aspects the results of intermediary steps are also stored in persistent storage media. This allows faults in the pipeline system to be understood and fixed, particularly as regards determining the point at which the pipeline malfunctioned. Finally, these results may have utility in related pipelines. Persistently storing these results ensures that they are accessible for use in these related pipelines.

Further benefits of this enhanced implementation relate to displaying the results of the pipeline steps. The results of each pipeline step do not have to be written to the persistent storage media to be displayed. Instead, they are contained in temporary memory. It is, therefore, possible to display all of the results of the pipeline steps to the user before these write operations have been completed. This enables these results to be displayed to users much more quickly. Users, therefore, experience rapid result display and the benefits of storing the results to a persistent storage medium.

Example Computer System

FIG. 1 illustrates an example of a computer system 100 configured to perform extraction. As shown, the computer system 100 includes a client computing device 112 used by a human user 110, a server 130, a database 140, a data pipeline system 150 and a temporary memory 160. The client computing device 112 and the server 130 may be configured to communicate with one another via a network 120. The network 120 may include the Internet, an intranet, a local area network, a wide area network, a wired network, a wireless network, a virtual private network (VPN), and/or any combination of networks. For ease of understanding, various components of the system have each been described with reference to one or more computing devices. It should be noted that, in some embodiments, any number of these components may be collocated on the same computing device.

The client computing device 112 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 112 may include one or more of a keyboard, a mouse, a display 114, or a touch screen (of which display 114 may be a part of). For example, the client computing device 112 may be composed of hardware components like those of computing device 500 described below with respect to FIG. 7. The client computing device 112 may also include a web browser or a client application configured to display, in a graphical user interface 116 of the client computing device 112 display 114, a computer program for developing and executing data processing pipelines.

The graphical user interface 116 may be presented in a web browser window, a client application window, an operating system window, an integrated development environment window, a virtual terminal window or other computer graphical user interface window. While only one user 110 and one client computing device 112 are illustrated in FIG. 1, the subject innovations may be implemented in conjunction with one or more users 110 and one or more client computing devices 112.

The server 130 may be implemented as a single server computing device or as multiple server computing devices arranged in a distributed or clustered computing arrangement. Each such server computing device may be composed of hardware components like those of computing device 500 described below with respect to FIG. 7.

The server 130 may include one or more processors (e.g., CPUs), a network interface, and memory. The processor(s) may be configured to execute computer instructions that are stored in one or more computer-readable media, for example, the memory of the server 130. The server 130 may include a network interface that is configured to allow the server 130 to transmit and receive data in a network, e.g., network 120 of FIG. 1. The network interface may include one or more network interface cards (NICs). The memory of the server 130 may store data or instructions. The instructions stored in the memory may include the data pipeline system control module.

The server 130 includes a data pipeline development environment 132 configured to develop a data pipeline to be executed on a data pipeline system 150. The data pipeline development environment enables a user to specify data items 144 used by the pipeline, created data objects 146 created by the pipeline, and transforms and dependencies between them. This specification may be stored as data pipeline configuration data 142. The data pipeline development environment may also run the data pipeline using the data pipeline system 150 and display the results of the steps of the data pipeline to the user 110 via the client 112 and GUI (graphical user interface) 116. While the data pipeline development environment 132 is shown as being located on the server 130, it should be noted that in many embodiments at least some of the specified functionality is stored in and/or executed on the client 112. Examples of these embodiments include client-server applications where a GUI 116, e.g. via a web browser or desktop application, interacts with a server 130 via a network 120, which provides a portion of the foregoing functionality.

In many embodiments, the data pipeline development environment 132 is an integrated development environment (IDE), a software environment providing many facilities for software development, such as source code editing and code execution, within an integrated system.

The data pipeline development environment 132 includes a template generator 134. The template generator 134 provides functionality enabling a user 110 to generate a transform template. The transform template may be stored on the database 140 as pipeline configuration data 142. This enables the user 110 to reuse the template and allows other users to use it.

The database 140 is used to retrieve and store data items such as data items 144 and created data objects 146. The database 140 may also store pipeline configuration data 142. The database 140 may be implemented as a single server computing device or as multiple server computing devices arranged in a distributed or clustered computing arrangement. Each such server computing device may be composed of hardware components like those of computing device 500 described below with respect to FIG. 7.

The database 140 may include one or more processors (e.g., CPUs), a network interface, and memory. The processor(s) may be configured to execute computer instructions that are stored in one or more computer-readable media, for example, the memory of the database 140. The database 140 may include a network interface that is configured to allow the database 140 to transmit and receive data in one or more networks, e.g., a network connecting the server 130 and the database 140 and a network connecting the data pipeline system 140 to the database 140, which may be the same or different network as the network that connects the server 130 and the database 140. The network interface may include one or more network interface cards (NICs). The memory of the database 140 may store data or instructions. The instructions stored in the memory may include the database server module 142. While reference has been made to a database, it should be noted that alternatively or in addition any other data storage mechanism may be used, e.g. a file storage system, a distributed file system, and/or in-memory objects.

The pipeline configuration data 142 may be stored in markup language format, e.g. XML or YAML, and/or a series of database rows. In addition or alternatively, the pipeline configuration data may be stored as interpretable and/or executable code. There are a variety of other formats that could be used to store this data such as proprietary binary formats, text data and/or command line parameters. The pipeline configuration data 142 includes indications of transforms, the data items 144 to be used, the data objects 146 to be created and dependencies between them.

The data items 144 may be rows of a database table, or entries contained in a document-oriented or objected-oriented database. The data items 144 may also be in-memory objects. Alternatively, the data items 144 may be files, markup-language data, code portions, spreadsheets and/or images. It should be recognized that the types of data items 144 are not limited to only one of the preceding categories and could be any number or combination of these categories. For example, some portion of the data items 144 could be files and some other portion could be database rows. The types of the created data objects 146 could be any number of the types specified above. The created data objects may also be graphs configured to be displayed in the data pipeline development environment 132.

The data pipeline system 150 includes functionality for running a data pipeline. The data pipeline system 150 may use the data pipeline configuration data 142 stored on database 140 to determine the steps of the data pipeline. The data pipeline system 150 may use data items 144. The data pipeline system 150 may also use and/or store created data objects 146.

The data pipeline system 150 may be implemented as a single server computing device or as multiple server computing devices arranged in a distributed or clustered computing arrangement. Each such server computing device may be composed of hardware components like those of computing device 500 described below with respect to FIG. 7.

The data pipeline system 150 may include one or more processors (e.g., CPUs), a network interface, and memory. The processor(s) may be configured to execute computer instructions that are stored in one or more computer-readable media, for example, the memory of the data pipeline system 150. The data pipeline system 150 may include a network interface that is configured to allow the data pipeline system 150 to transmit and receive data in a network, e.g., a network connecting the data pipeline system 150 and the database 140 which may be the same or different network as the network that connects the data pipeline system 150 and the server 130. The network interface may include one or more network interface cards (NICs).

A temporary memory 160, such as a random access memory (RAM), is accessible by the data pipeline system 150. Typically, the temporary memory 160 is a component of at least one of the server computing devices of data pipeline system 150. Alternatively, the temporary memory may be located on another machine and/or a RAM blade and transferred across a high bandwidth, low latency network from these systems.

It should be noted that temporary memory refers to its usage as a temporary store and does not necessitate that said memory is volatile, e.g. RAM. In some embodiments, the temporary memory 160 is a type of non-volatile memory, such as a solid state drive (SSD) and/or any other non-volatile solid state memory. An SSD is faster but is both more expensive and has a more limited capacity than a hard disk drive (HDD). It may be advantageous to use an SSD as a temporary memory. This would be particularly beneficial when the database 140 uses a HDD for storage. Alternatively, the temporary memory 160 may comprise both RAM and one or more non-volatile solid state memories, such as SSDs. The RAM provides a faster, smaller store that may be used first with the non-volatile solid state memory providing fallback capacity.

The data pipeline system 150 may store data items 144 and created data objects 146 in the temporary memory 160 in addition to or instead of in the database 140. This may allow the data pipeline to perform transforms and output results more quickly as the temporary memory is likely to be significantly faster than the database 140.

Transform Template Generation and Execution

Figure 2:
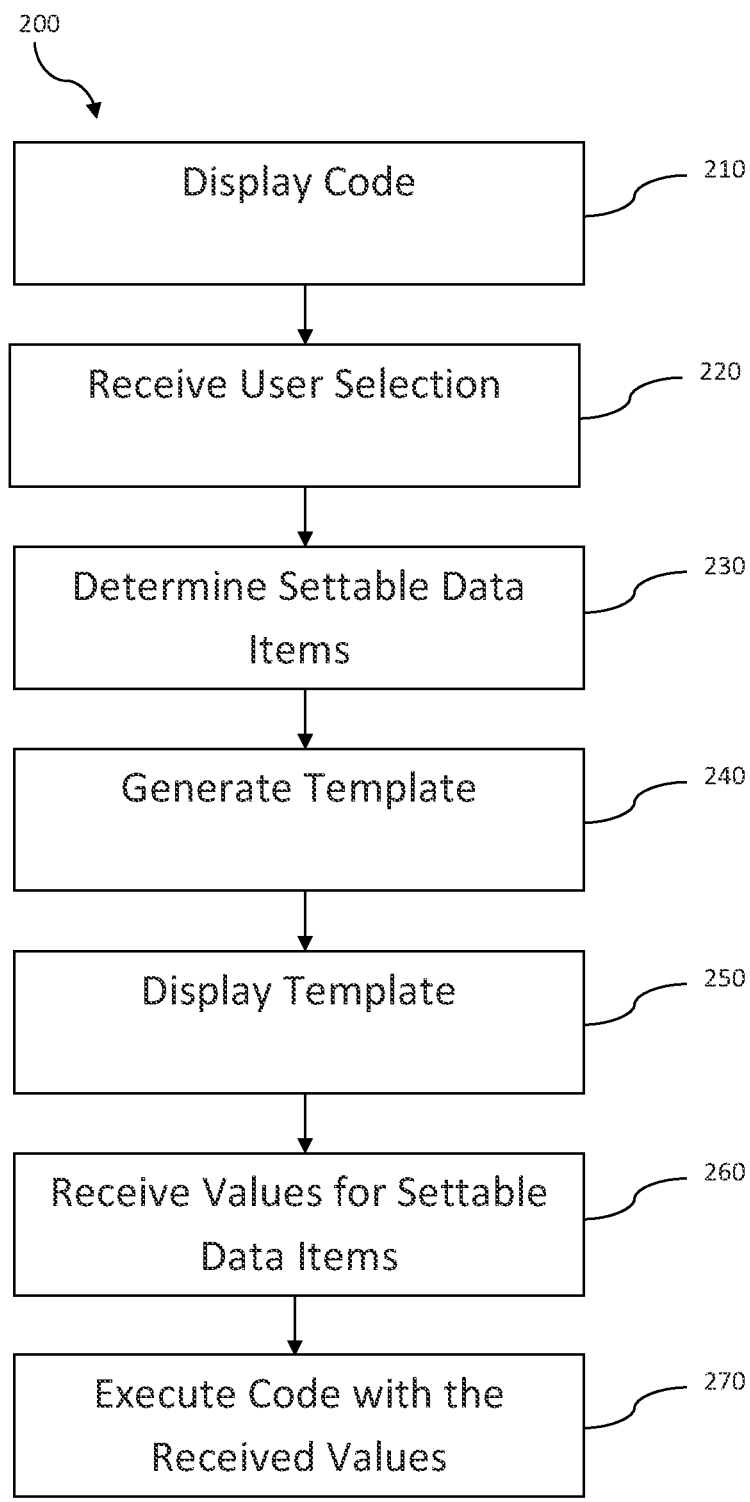
FIG. 2 is a flow diagram illustrating an example method by which templates are generated and the associated code executed using the template, in accordance with example embodiments.

FIG. 2 is a flow diagram illustrating an example method 200 by which transform templates are displayed and executed. The method 200 is performed by software when executed by one or more computing devices (e.g., the computing device 500 of FIG. 7). In some embodiments, the one or more computing systems are part of the client 112, the server 130, and/or the data pipeline system 150.

The method 200 begins at step 210, where the transform template generator 134 displays some code of a code transform that is available to the data pipeline development environment 132, henceforth referred to as the IDE without limitation, to a user 110. The code is in a programming language supported by the IDE 132 and/or the data pipeline system 134. Examples include, but are not limited to, Python, Java, Scala and C #. Alternatively or in addition, the code is in some supported markup language format, such as XML, HTML or YAML. In some embodiments, the code includes sections which are in different programming languages and/or markup languages. For example, the displayed code may include sections of both Python and YAML, or sections of both C # and XML.

In step 220, a user selection of some portion of the code is received by the template generator 134. The user may select the portion of code by tapping and dragging over the code using a mouse or touch screen interface. Alternatively or in addition, the user may use a keyboard shortcut to select the code. If the code is displayed on the computing device on which the template generator 134 is located, the selection may be received by the template generator 134 via an API and/or application variable. In other embodiments, the user selection is received by the template generator 134 via a network 120. The user selection may be received using a variety of appropriate protocols, e.g. REST, SOAP or RabbitMQ.

In step 230, the settable data items, e.g. variables, parameters and column names, are determined from the selected portion of code. The template generator 134 may then store this name and/or a reference to the settable data item for use in the template. The settable data items may be determined when a user input is made (e.g. a button is pressed) and/or automatically when an appropriate selection is made.

In some instances, the selected portion of code contains just the name of a settable data item. This name may simply be stored. However, to avoid errors, the template generator 134 may need to recognize that the selected portion of code is, in fact, a settable data item name. The template generator 134 may do this by analyzing the context within which the selected portion of code is contained, e.g. using a regular expression. Alternatively or in addition, it may use a metaprogramming library to analyze the received code. There may be other instances of this settable data item within the code that can be recognized using the same techniques.

In other circumstances, the selected portion of code contains extraneous text in addition to the settable data item name. In these instances, similar techniques to those specified for recognizing the settable data item name may be used to extract the settable data item name from the selected portion of code. There may be multiple instances of the settable data item name within the code and/or multiple settable data item names may be contained within the selected portion. Similar techniques, such as regular expressions, may be used to recognize these. All or some references to or names of these settable data items may then be stored.

In some scenarios, a portion of code may be selected that does not reference a settable data item name, e.g. a string or a floating point number. The template generator 134 may recognize that this value is still settable, e.g. the value can be replaced by any other string or number. In these circumstances, the template generator 134 may store the location of this value within the code instead of a name. If there are other instances of this value, the template generator 134 may also store these locations. Alternatively, using similar techniques to those previously described, the template generator may be able to determine the corresponding settable data item name.

It should be noted that the template generator may support any number of the foregoing techniques for determining the settable data item. The steps above may be repeated several times until all of the settable data items that the user desires in the template have been stored by the template generator 134. In this way, multiple user selections are received and used to determine the settable data items.

In step 240, a template is generated using the stored settable data items names and/or references. This template also contains a reference to the stored code. The generated template may be stored in a variety of formats including both markup language and executable code. Examples of markup languages include HTML, XML and YAML. Alternatively, the template may be stored as a database record or in a custom proprietary format. The stored template is typically a specification used to display an interface in the subsequent step. Typical formats for such a specification are any of the foregoing markup languages or data contained in one or more database tables. Alternatively, the stored template may be executable code which when run causes the template to be displayed.

The template generator 134 may first convert the stored details in to a common internal representation. A template may then be created from these along with any other needed configuration. The template is stored using appropriate APIs to store and write in any of the formats specified above. This configuration may be stored globally, e.g. as part of the pipeline configuration data 142.

In step 250, the template is displayed. The template may be displayed immediately on generation and/or may be displayed later, e.g. when selected by a user. The displayed template presents an interface to the user indicating the settable data items and presenting an interface whereby they are able to set them. If the stored template is executable code, the template is executed and subsequently displayed. While they may be desirable, no further steps are strictly necessary. If the stored template is a specification, the template is processed to receive the details necessary to display the template interface. A template interface is then dynamically displayed using the stored generated template.

The template is typically displayed by the IDE 132, which uses a suitable mechanism to generate the interface. Suitable mechanisms include web frameworks, e.g. AngularJS, Apache TomCat or Django, or desktop application frameworks, e.g. Qt, GTK, WPF or Swing.

In step 260, values are received for the settable data items. These are received from a user 110 via the displayed template using any suitable input mechanism. Examples of such mechanisms include touch screen input, keyboard entry and selecting from a drop down list using a mouse. The values may be received immediately upon their entry and/or may be received on some further input, e.g. a screen tap or button press.

In some embodiments, the values are received by the IDE 132. The IDE 132 uses them, in combination with the related code, to create a transform that may be added to a data pipeline. The details of this transform, including the received values, may be stored as part of the pipeline configuration data 142 and displayed as a transform in the IDE 132. In this case, the method proceeds to step 270 when the data pipeline is run. For example, the data pipeline may be run when a run command is received from the user 110 via the IDE. Alternatively, a command to run the data pipeline may be received from another user and/or an administrator.

In other embodiments, the values are received directly by the data pipeline system 150. In this case, the method proceeds to step 270 immediately.

In step 270, the code is executed on the data pipeline system 150 with the settable data items set to the received values. These settable data items may be set using any or any combination of a variety of mechanisms, e.g. replacing or otherwise changing the text characters of the code, metaprogramming and API calls. As previously specified, this may happen subsequent to receiving values or after a command to run the relevant pipeline.

Example Template Generator User Interface

Figure 3:
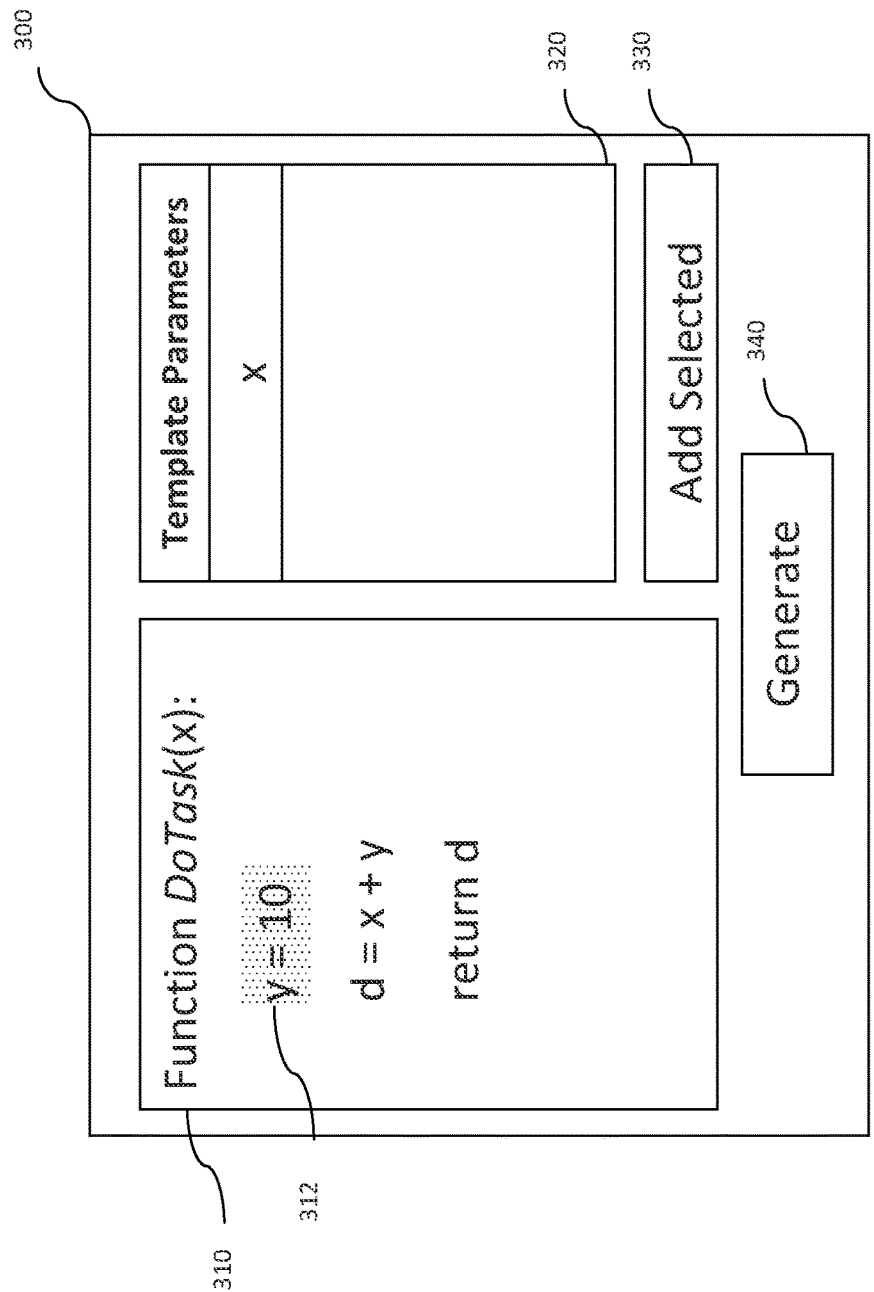
FIG. 3 is a representative drawing, illustrating an example graphical user interface configured to generate templates, in accordance with example embodiments.

FIG. 3 illustrates an example graphical user interface 300 (e.g., a web browser window) configured to enable a user 110 to generate a transform template according to the method described in steps 210-240 of FIG. 2. The interface 300 may be displayed via the display 114 of the client computing device 112.

The interface 300 includes a textbox 310 containing code. Alternatively, non-editable text on the interface 300 may display the code. The code is typically the code of a transform that has been specified by the user 110 or some other user. In this instance, the code returns the sum of two settable data items x and y. The box 310 may be scrollable, e.g. using a scrollbar and/or a touchscreen gesture, to allow more code to be displayed than can fit within the box. In this example, a portion of code 312 that references a settable data item, y, has been selected.

The list 320 shows the settable data items whose references and/or names have already been stored by the template generator 134. In this example, a reference to the function parameter x has already been stored.

The button 330 allows the user 110 to store a reference to the settable data item corresponding to the selected portion of the code 312. In the instance shown, the user causes storage of the name of and/or a reference to variable y by providing an input, such as pressing button 330. A representation of the template variable y is then caused to be displayed in the list 320.

The button 340 allows the user 110 to generate a template based on the code and the stored names of and/or references to settable data items. When this button is selected by the user, the template is generated and may be stored and/or displayed.

Example Template User Interface

Figure 4:
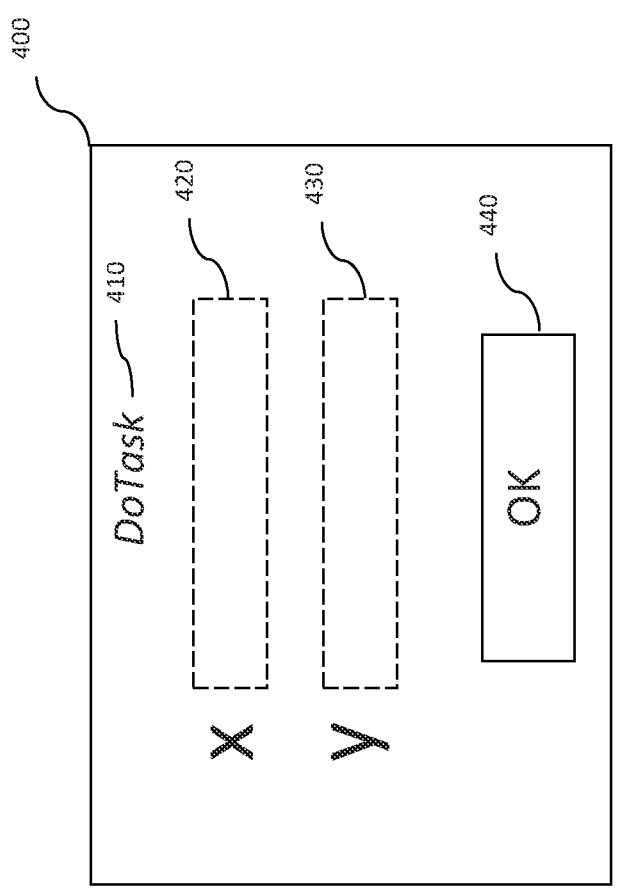
FIG. 4 is a representative drawing, illustrating an example graphical user interface of a generated template configured to receive values for the display settable data items, in accordance with example embodiments.

FIG. 4 illustrates an example graphical user interface 400 (e.g., a web browser window) of a transform template. The transform template may have been generated according to steps 210-240 of the foregoing method. It may be used to perform step 260 of this method. The interface 400 may be displayed via the display 114 of the client computing device 112.

The interface 400 contains a title 410. The title 410 specifies the name of the template. This may be the name of the function from which the template was generated or may be a user specified name.

The first input box 420 and the second input box 430 allow the interface 400 to receive values for settable data items x and y, respectively, from a user 110. The input boxes 420, 430 are provided with labels that indicate the settable data item to which they relate.

When the OK button 440 receives a user input, e.g. a mouse click, the data items are received by the IDE 132. A transform is then created based on the code associated with the template and the received data items. This transform is displayed in the IDE 132 for use in the current pipeline. It may also store the transform details, including the received values, in the pipeline configuration data 142. The values are then used when the data pipeline is run. Alternatively, the values may be received by the data pipeline system 150, and the code associated with the template executed with settable data items set to the received values.

Example Data Pipeline Development Environment User Interface

Figure 5:
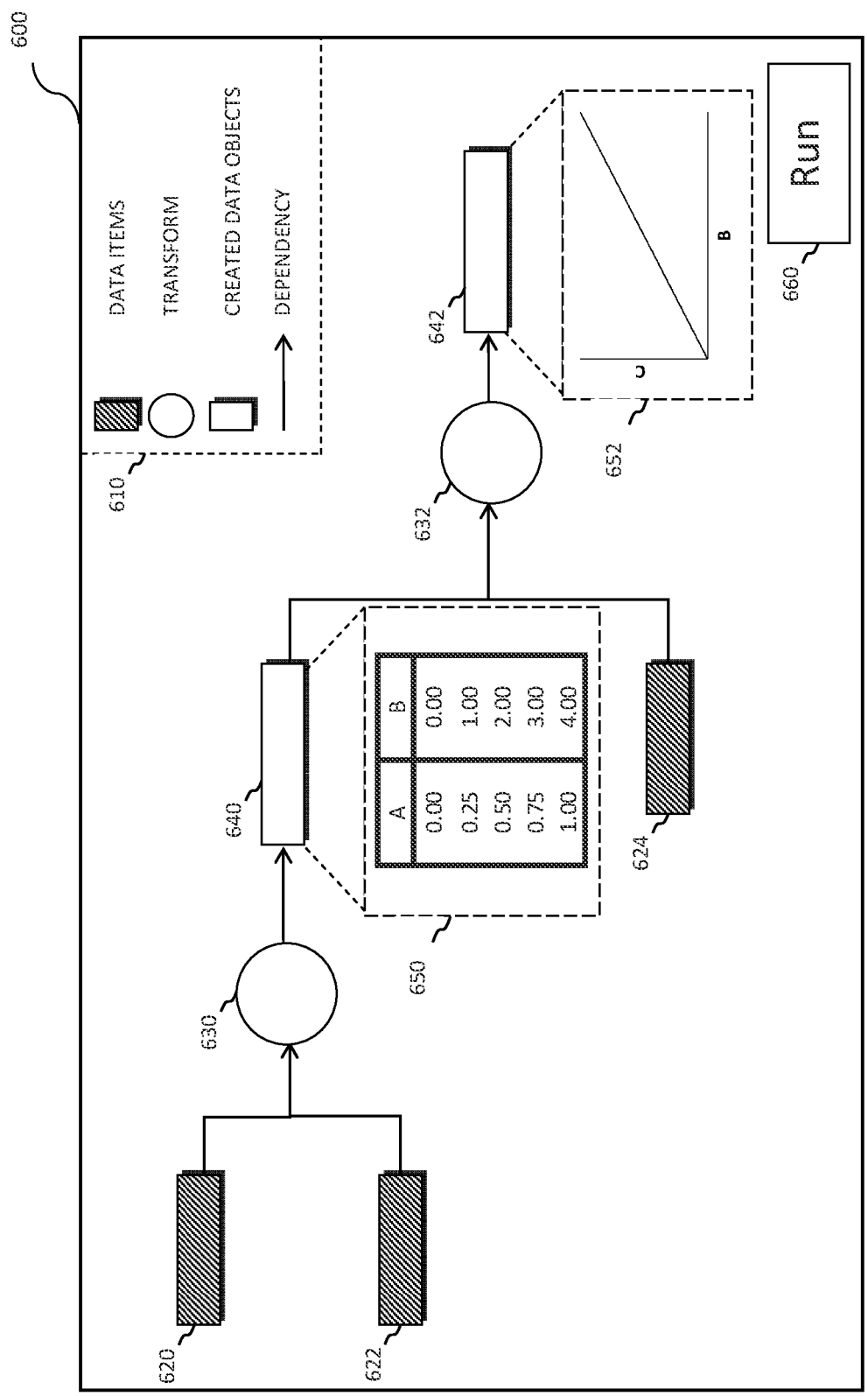
FIG. 5 is a representative drawing, illustrating an example graphical user interface of a data pipeline development environment, in accordance with example embodiments.

FIG. 5 illustrates an example graphical user interface 600 (e.g., a web browser window) of a data pipeline development environment (e.g., data pipeline IDE 132). The interface 600 provides a representation of the data pipeline currently under development and enables the user to configure the data pipeline. This configuration of the data pipeline may involve adding data elements, adding transforms, editing either of the foregoing, specifying dependencies between pipeline elements and/or specifying the properties of data pipeline elements. The data pipeline displayed may have been created using the interface 600 and/or may have been inferred from an existing data pipeline. The interface 600 may also provide functionality to run the pipeline and to display the results. The interface 600 may be displayed via the display 114 of the client computing device 112.

The interface 600 may contain a key 610 indicating how the different elements of the interface are represented. The key may be used, e.g. by the user 110, to quickly determine the type of each element in the user interface without needing to access external help documentation. For example, the key shows that arrows represent dependencies between the elements of the data pipeline. Input on one of the elements contained in the key 610 may also be received by the interface 600. In response to this input being received, the respective element is added to the data processing pipeline under development. This input may be a mouse click on these elements, a keyboard shortcut, or a drag and drop action.

The interface 600 displays symbols 620, 622, 624 indicating the data items (e.g., data items 144) used by the data processing pipeline. Data items may be added to the pipeline using the key 610 as previously specified. Alternatively or in addition, data items may be added using some other input mechanism, e.g. a keyboard shortcut. New corresponding symbols are then displayed in the interface 600. Further details of the data item may be displayed by the interface 600 in response to it receiving some input corresponding to the symbol, e.g. a user hovering over (mousing over) the symbol, tapping the symbol or double clicking on the symbol. Receiving input corresponding to these symbols 620, 622, 624 may also cause the interface 600 to display a sub interface and/or another window whereby the user 110 can configure the properties of the data item and/or how it is used. Properties may include the database to be used, the table name to be used and its user friendly name to display in the pipeline development environment 132. Indications of how the data item is to be used may include how it should be cached, and the number of elements of the underlying data item to be loaded. Alternatively or in addition, these details may be specified when the transform is added to the pipeline.

The interface 600 displays symbols 630, 632 representing transforms used by the pipeline development environment. The data items/objects upon which the transform depends are represented as arrows in the interface 600. These transforms may take any of the forms previously specified, e.g. code transforms, selected transforms and/or transforms created from a template. A transform may be added to the pipeline using the key 610 as previously specified. Alternatively or in addition, data items may be added using some other input mechanism, e.g. a keyboard shortcut. New corresponding symbols are then displayed in the interface 600. A sub interface and/or window adapted for configuring the transform (e.g. interface 400 of FIG. 4) may be displayed by the interface 600 in response to it receiving some input corresponding to the symbol, e.g. a user hovering over (mousing over) the symbol, tapping the symbol or double clicking on the symbol. The sub interface and/or window for configuring the transform may have been previously generated using a template generator graphical user interface (e.g. interface 300 of FIG. 3). Similarly, a sub interface and/or window adapted for specifying the transform may be displayed when such input is received. The transform may be specified by entering code in to an entry form, selecting a transform from a displayed list, or selecting a template from a list and entering the values of the settable data items using an interface (e.g. interface 400 of FIG. 4). Other properties of the transform may also be specified. These may include the user friendly name of the transform, the data items/objects on which the transform depends and/or the programming framework version used to execute the transform. Alternatively or in addition, the transform may be specified and these properties set when the transform is added.

For ease of explanation, the transforms and data items will be referred to in this paragraph using the reference numerals of their symbols. In the first example transform 630, a table is created containing columns A and B. The first table 620 contains a column A and the second table 622 contains a column B. The tables are then joined using a key reference from one table to the other, e.g. a column of table 620 contains a primary key of table 622. The columns A and B are then returned from the joined result. This transform may be performed using any appropriate technology, e.g. SQL or a database access library. In the second example transform 632, a graph is created from the created table 640 and the database table 624. A SQL library, e.g. SQLAlchemy or Hibernate, may be used to retrieve the required data, column C, from the database table 624. The transform then combines this with column B from the created data object 640 and creates a graph using a charting library, e.g. Matplotlib or JFreeChart.

The interface 600 displays symbols 640, 642 representing data objects 146 that have been or are able to be created by the pipeline transforms. These created data objects 146 may take any of the forms previously specified, e.g. tables or graphs. The created data objects are shown automatically when a transform 630 has been created. An arrow from the transform symbol 630, 632 to the created data object symbol 640, 642 shows which transform is used to create the data object. Further details of the data item may be displayed by the interface 600 in response to it receiving input corresponding to the symbol, e.g. a user hovering over (mousing over) the symbol, tapping the symbol or double clicking on the symbol. Receiving input corresponding to these symbols 640, 642 may also cause the interface 600 to display a sub interface and/or another window whereby the user 110 can configure the properties of the created data object. Properties may include the database to store the created data object in, the table to store it in and its user friendly name to display in the pipeline development environment. Alternatively or in addition, these properties may be set when the symbol 640, 642 for the created data object is automatically added.

Examples of the further details displayed on appropriate input to the created data object symbols are shown in 650 and 652. 650 shows the table indicated by created data object symbol 640 and created by transform 630. 652 shows the graph indicated by created data object symbol 642 and created by transform 632. This may be a separate window displayed on some mouse input, e.g. a double click, and/or may appear within the interface 600 when the user 110 hovers over the created data object symbol 640.

A button 660 may be provided to run the data pipeline. The button may respond to any appropriate input, e.g. a mouse click and/or a touch screen tap. The data pipeline system 150 is then run with the data pipeline displayed in the data pipeline development environment 132. If the data pipeline is unable to be run for any reason, the interface 600 may display an error indicating the reasons why the data pipeline cannot be run. Similarly, if the data pipeline system 150 attempts to run the pipeline but fails for any reason, the interface 600 may display details of the failure and any available information that can be used for debugging.

Example of Enhanced Data Pipeline Implementation

Figure 6:
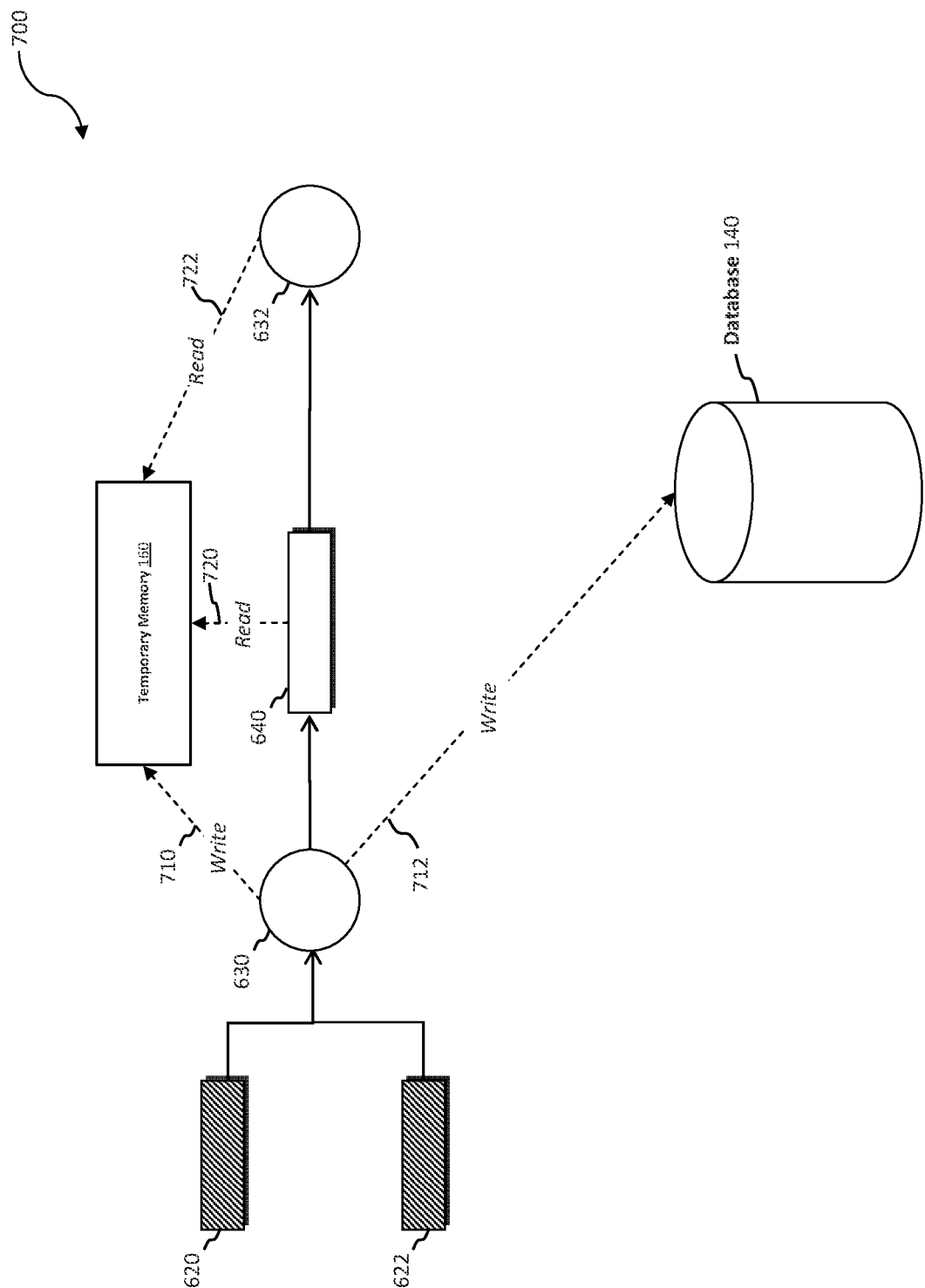
FIG. 6 is a schematic diagram, illustrating the interactions between a data processing pipeline and the storage devices of an example computer system, in accordance with example embodiments.

FIG. 6 is a schematic diagram of an enhanced data pipeline implementation 700 relating to a second aspect of the invention as described in the overview. The implementation illustrated may be performed by the data pipeline system 150. It should be noted that the symbols 620-640 as used in FIG. 6 refer to elements of a data pipeline itself in this figure rather than user interface elements.

As before, data items 620 and 622 are used by a transform 630 to create some new data object, e.g. a table or chart. Once the transform has been completed, a first write operation 710 writes the created data object to a temporary memory 160. In parallel or subsequently, a second write operation 712 writes the created data object to a database 140. In both instances, the second write operation 712 is much slower than the first write operation 710. The created data object 640 may, therefore, be read from the temporary memory 160 before write operation 712 has completed. In some instances, the data object is read for display as in read operation 720. In other instances, the data object is read by a subsequent transform in the pipeline as in read operation 722. It should also be noted that, due to temporary memory 160 being significantly faster than the database 140, it is still beneficial to read the created data object from temporary memory even after write operation 712 has completed.

In some embodiments, write operation 712 depends on write operation 710. For example, the temporary memory 160 may be used as a write-back cache. In this instance, write operation 710 occurs first. The data pipeline, and potentially other data pipelines and processes, may then access the created data object 640 from the temporary memory 160. The write operation 712 may then be postponed until a later point. At this point, the created data object 640 is written from temporary memory 160 to database 140. This write operation may happen when the created data object is due to be removed from the temporary memory 160. It may be due to be removed because the temporary memory requires the space to store another created data object or a system shutdown is imminent. Alternatively or in addition, the write operation 712 may occur at regular intervals as a safeguard against system failure. These regular intervals may be configured to be a fixed value, e.g. every two minutes; or may be determined by the system as to dynamically tradeoff between performance and robustness depending on the characteristics of the data and/or the system. The dynamically determined interval may be determined by a statistical algorithm that uses historical logs to determine the estimated probability of data loss for a given interval.

The foregoing implementation provides considerable advantages as it allows the created data objects 640 to be displayed quickly in interface 600. It also enables the data pipeline 700 to be executed on the data pipeline system 150 significantly more quickly. The results of the transforms 630 and 632, and any steps which are dependent upon them, may therefore be obtained more quickly. In addition, writing back to the database 140 ensures that a persistent copy of the data is also stored, and so may be used and displayed at later dates. The illustrated implementation is, therefore, significantly more robust than systems that write only to temporary memory 160.

Example Computing Device

Figure 7:
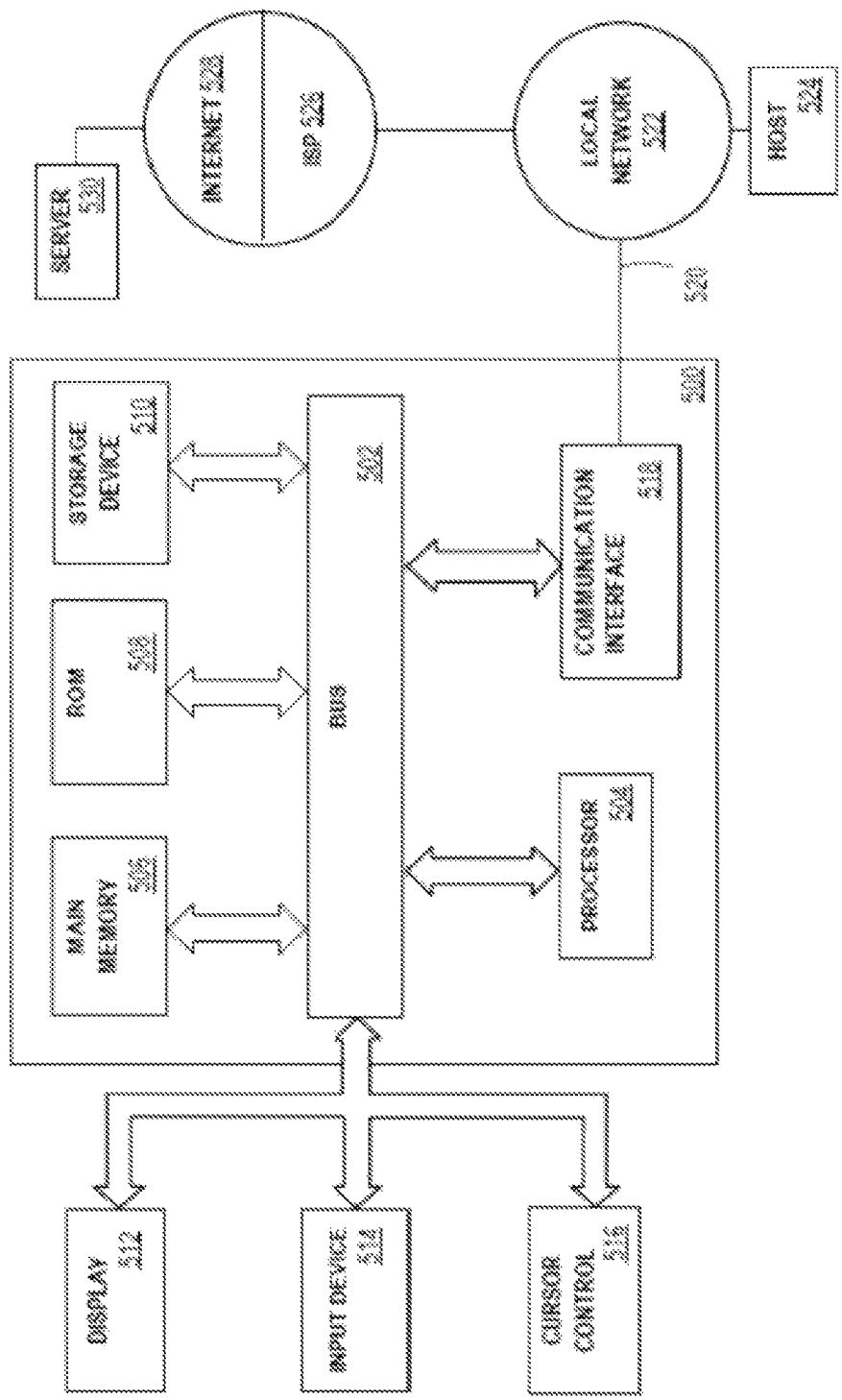
FIG. 7 is a schematic diagram of a computing device in which software-implemented processes of the subject innovations may be embodied.

Referring now to FIG. 7, it is a block diagram that illustrates an example computing device 500 in which software-implemented processes of the subject innovations may be embodied. Computing device 500 and its components, including their connections, relationships, and functions, is meant to be example only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 514, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 7, one or more of display 512, input device 514, and cursor control 514 are external components (e.g., peripheral devices) of computing device 500, some or all of display 512, input device 514, and cursor control 514 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

The above-described computer hardware is presented for purpose of illustrating certain underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein. In an embodiment, the computer hardware, when executing software that causes the computer hardware to perform the various processes discussed herein, becomes a special purpose computer that performs particular useful applications.

Extensions and Alternatives

As previously specified, aspects of these innovations are applicable in contexts other than a data pipeline system. In particular, it would be clear to the person skilled in the art that the template generation and execution functionality relating to the methods and user interfaces illustrated in FIGS. 2-5 may be applied in any software development environment. The development environment need not be a pipeline development environment.

Such an example embodiment is a Python development environment. In this embodiment, the section of code displayed by step 210 of the method 200 and within the textbox 310 of interface 300 may be a Python module. The settable data items determined by step 230 may be Python module variables, instance attributes, method parameters and/or function parameters. These are determined using a selected portion of code 312 as previously described. Otherwise, template generation may occur generally as described in relation to the data pipeline system Some small modifications to the illustrated template interface 400 and associated method steps 250, 260, 270 may, however, be effected. For example, the title 410 may relate to the Python module or class name of the code displayed in textbox 310. Similarly, in response to receiving input to button 440, said code, e.g. the Python module, may be executed by the Python development environment with the settable data items set to the specified values. Alternatively, a code file, e.g. a Python module file, may be added to the currently open project in the Python development environment with the settable data items set to the specified values.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

What is claimed is:

1. A method performed by one or more processors, the method comprising:
    accessing a data transformation template comprising data transformation code in a markup language including a plurality of code segments, the data transformation code configured to transform data items, wherein the data transformation template indicates at least a first settable item of a first code segment and a second settable item of a second code segment; and
    initiating transformation of data items from a data source by:
    dynamically displaying a user interface including at least a portion of the data transformation template, the user interface allowing setting of the first settable items of the first code segment and the second settable item of the second code segment;
    receiving, via the user interface, in response to selection of the first code segment, a first user input value for the first settable item;
    receiving, via the user interface, in response to selection of the second code segment, a second user input value for the second settable item; and
    executing the data transformation code, with the received first and second user input values in place of the first and second settable items, on the data items from the data source.

2. The method of claim 1, wherein at least one of the settable items is set, during the executing, by changing text characters in the data transformation code.

3. The method of claim 1, wherein at least one of the settable items is set, during the executing, by application programming interface calls.

4. A computing system comprising:
    a hardware computer processor; and
    a non-transitory computer readable medium having software instructions stored thereon, the software instructions executable by the hardware computer processor to cause the computing system to perform operations comprising:
    accessing a data transformation template comprising data transformation code in a markup language including a plurality of code segments, the data transformation code configured to transform data items, wherein the data transformation template indicates at least a first settable item of a first code segment and a second settable item of a second code segment; and initiating transformation of data items from a data source by:
dynamically displaying a user interface including at least a portion of the data transformation template, the user interface allowing setting of the first settable items of the first code segment and the second settable item of the second code segment;
receiving, via the user interface, in response to selection of the first code segment, a first user input value for the first settable item;
receiving, via the user interface, in response to selection of the second code segment, a second user input value for the second settable item; and
executing the data transformation code, with the received first and second user input values in place of the first and second settable items, on the data items from the data source.

5. The computing system of claim 4, wherein at least one of the settable items is set, during the executing, by changing text characters in the data transformation code.

6. The computing system of claim 4, wherein at least one of the settable items is set, during the executing, by application programming interface calls.

* * * * *